May 12, 1931.  H. ROWNTREE  1,805,263

HEEL AND TOE CONTROL OF VEHICLES

Filed Feb. 9, 1929  4 Sheets-Sheet 1

Inventor
Harold Rowntree
By his Attorneys Darby & Darby.

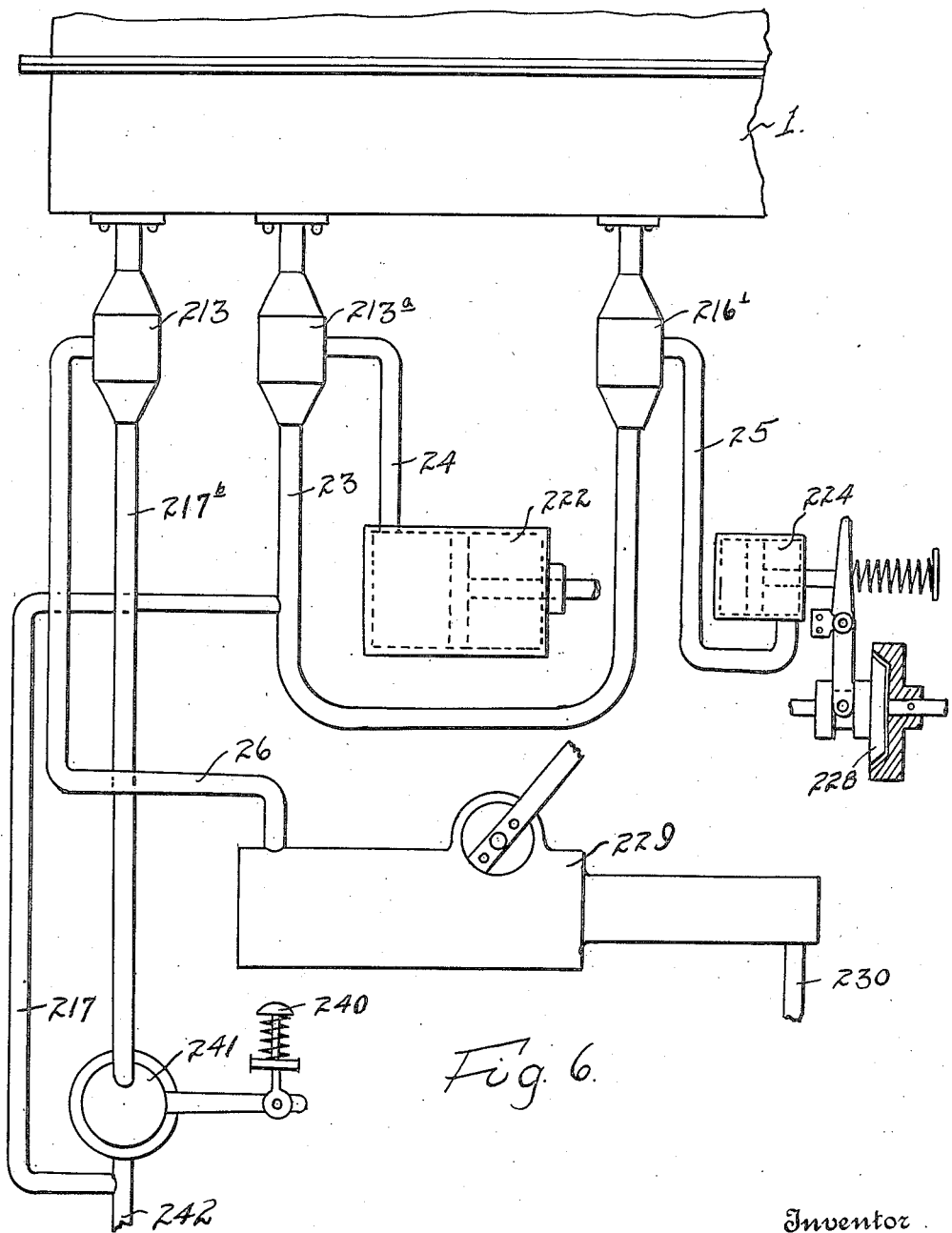

Patented May 12, 1931

1,805,263

UNITED STATES PATENT OFFICE

HAROLD ROWNTREE, OF SCARSDALE, NEW YORK, ASSIGNOR TO NATIONAL PNEUMATIC COMPANY, OF NEW YORK, N. Y., A CORPORATION OF WEST VIRGINIA

HEEL AND TOE CONTROL OF VEHICLES

Application filed February 9, 1929. Serial No. 338,672.

This invention relates to control mechanism for controlling the operating parts of vehicles, for example, motor buses, street cars, and the like, wherein the control is effected by the foot of the operator and further, wherein selectivity is effected as to the parts to be controlled, and is a continuation in part of my copending application Serial No. 705,992, filed April 12, 1924, a division of my co-pending application Serial No. 546,845, filed March 25, 1922, now Patent No. 1,516,502.

The object of the invention is to provide a control of the character set forth which is simple in structure, efficient in operation, and economical of manufacture, installation and maintenance.

A further object of the invention is to provide safety features in connection with the heel and toe control of my invention, which at all times safeguards the safety of the passengers in the event of accident to the motorman or the one operating the control.

Further objects of the invention will appear more fully hereinafter.

The invention consists substantially in the construction, combination, location and relative arrangement of parts, all as will be more fully hereinafter set forth as shown by the accompanying drawing and finally pointed out in the appended claims.

Referring to the drawings:

Fig. 6 is a modification of the arrangement shown in Fig. 2.

The same part is designated by the same reference character wherever it occurs throughout the several views.

Figure 1:
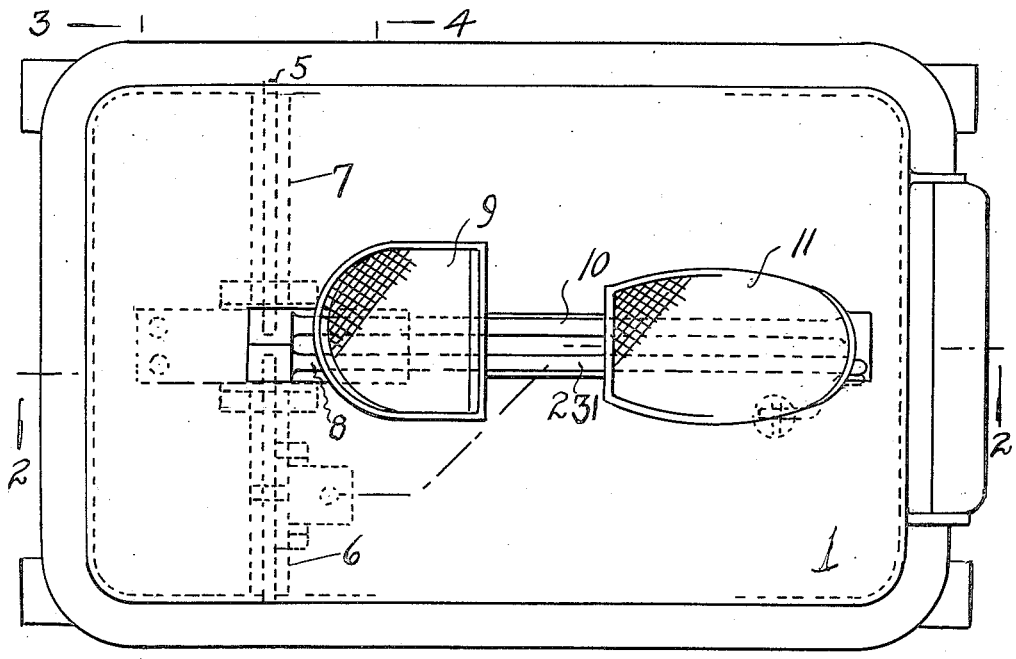
Fig. 1 is a top plan view of a control box designed for use in connection with motor buses.

Generally in motor buses, there is only one door to control, which door can be controlled directly by a valve in the control box. As motor buses are always controlled from the same end the cover of the control box is unnecessary, also, it appears preferable to use fluid pressure or mechanical control for all functions. In one arrangement the heel and toe control box is illustrated by reference character 1, and contains the transverse shaft 5 on which are mounted the two sleeves 6 and 7 controlled by the heel and toe pedals 9 and 11, respectively. In this arrangement I employ five downwardly projecting levers, three on the heel sleeve 6 and two on the toe sleeve 7. One lever 200 of the toe sleeve and one lever 201 of the heel sleeve are positioned between arms 203 and 204 of a pair of oppositely placed bell crank levers which are pivotally mounted as at 205 upon a suitable support, for example, 215, positioned in the box 1. One lever 207 on each of the sleeves 6 and 7 is utilized to form a seat for the springs 13, which normally tend to maintain the heel and toe pedals in their extended position. The last lever 208 operates against arm 209 of a bell crank lever which is likewise pivotally mounted as at 220, see Fig. 2. The foregoing description of the pedal mechanism in the control box has been given to make clear the operation of the arrangement of Fig. 2. The control box in this figure is constructed with two valves 213 and 216'.

Arm 210 of bell crank 203 bears against a rounded head 211 carried at the end of a stem 212 of valve 213 operating in a valve chest 214. A spring 206 interposed between the head 211 and the control box 1 normally tends to keep the valve in position to close the exhaust port 216. When the valve is in normal position it opens communication from pressure supply pipe line 217 to the respective lines 218 and 219. When the valve is depressed by means of the bell crank 203, 210, pipe lines 219 and 218 are opened to exhaust 216. Arm 220′ of bell crank 209 operates a similar valve 216′, supply connection being obtained through pipe line 217ª, the valve also controlling a pipe line 221. Pipe line 219 leads to a brake cylinder 222 of the usual construction containing therein the piston which is connected by a connecting rod 223 to the brakes. Pipe line 221 is connected to a pneumatic cylinder 224 containing therein the piston, the connecting rod of which is attached to a clutch lever 225, normally retained in such position, for example, by means of the tension spring 226. The clutch is pivoted at 227 and is provided with a fork connection with the clutch 288 diagrammatically illustrated in Fig. 2. Pipe line 218 connects to the motor 229, which controls the door. As indicated, the door motor is of the differential cylinder type, the control connection being at the end of the cylinder of larger diameter, the cylinder of smaller diameter being in constant communication with the source of supply through pipe connection 230, whereby in the usual well known manner in the pneumatic motor art, by supplying pressure to or exhausting the same from the end of the cylinder of larger diameter the operation of the motor is effected. The motor is connected to the door, not shown, in the usual manner common to door operating engines. If desired, instead of having the one valve 213 control pipe lines 218 and 219, as illustrated in Fig. 2, separate valves 213 and 213ª controlled by bell crank levers 203, 210 may be employed as in Fig. 6.

The lever 204 controlled by arm 201 is connected by means of a rod 231 to one arm 232 of a bell crank lever pivotally supported within the box as at 233, the other arm 234 of which is pivotally connected to a rod 235, which rod is normally maintained in a raised position by means of a compression spring 236 secured at one end to the heel and toe control box 1 and at the other end to a collar 237 mounted on the rod. The rod 235 extends through the control box 1 and operates the gas accelerator, shutting down the gas when spring 236 is depressed, and turning on more gas when spring 236 is extended.

Figure 2:
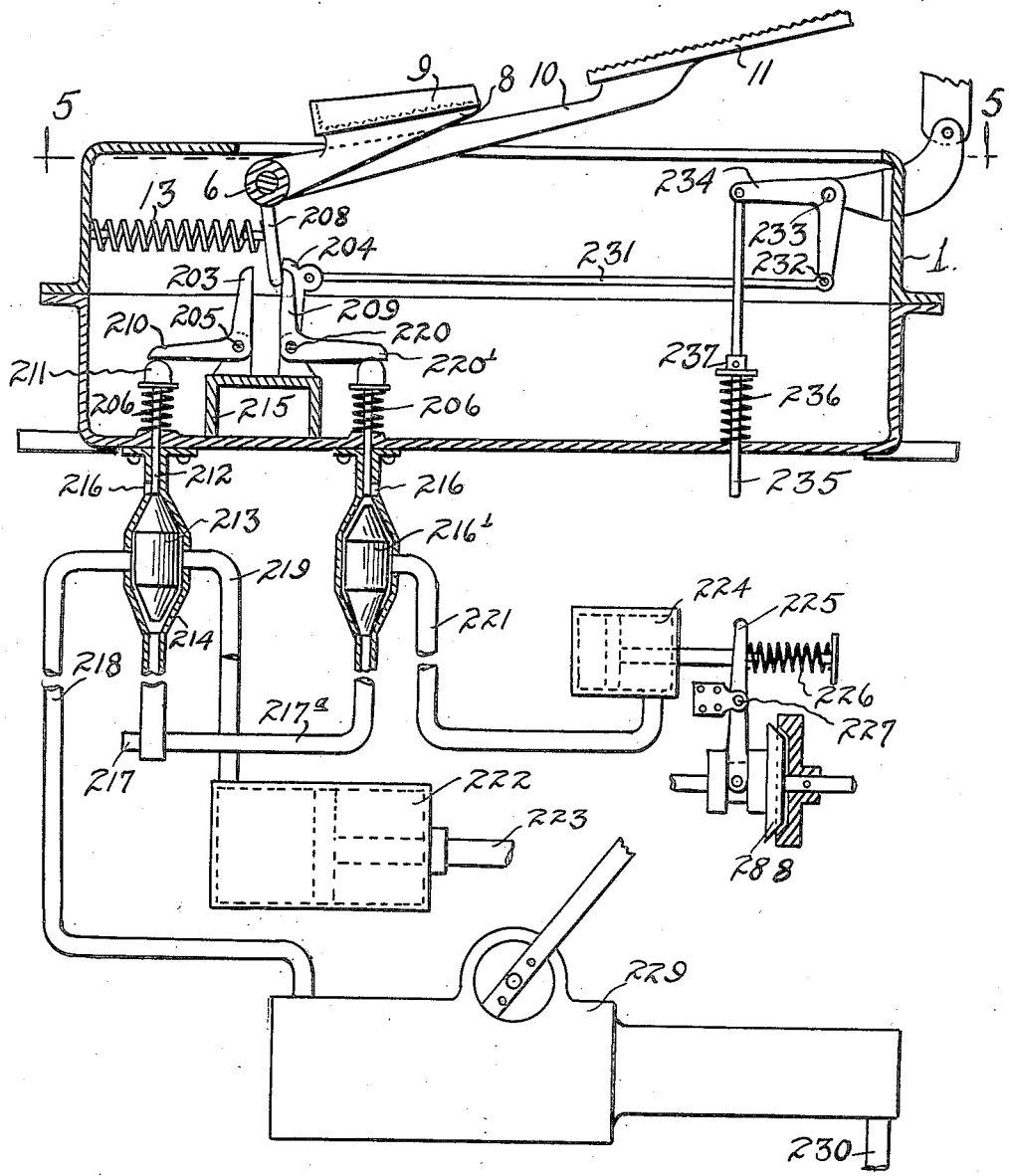
Fig. 2 is a sectional view taken on the line 2, 2, Fig. 1, and looking in the direction of the arrows, showing diagrammatically arranged relative thereto the parts controlled by the heel and toe control.
Figure 5:
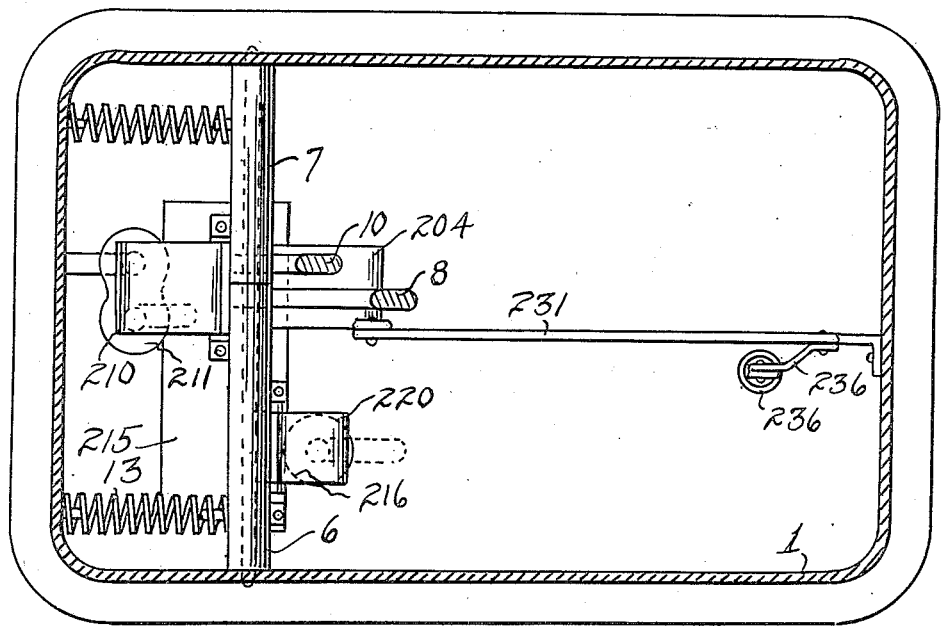
Fig. 5 is a sectional view of the structure taken on line 5, 5 of Fig. 2.

From the foregoing it will readily be seen that when the foot is removed from both the heel and toe levers the parts are in the position shown in Fig. 2, that is, bell crank 209, 220, is rocked to shut off communication between supply line 217ª and clutch 288 thereby, due to the tension of spring 226 positioning the clutch, is in disengaging position. Arm 204 is rocked by the lever or finger 201 so as to depress the spring 236 shutting off the gas supply. Bell crank 203, 210 is rocked clockwise due to spring 206 so that fluid pressure is supplied from pipe line 217 to pipe lines 218, 219 thereby operating the door motor to open the door and applying the brakes.

Therefore, when the foot is completely removed the door is open, the gas is shut down, the clutch out, and the brakes applied.

By a reversal of the position, i. e. both heel and toe depressed, the door is closed, the gas turned on, the clutch is in, and the brake is off. When the heel is up and the toe is down, the door is closed, the gas shut down, the clutch is out, and the brakes are off, so that the gearing can be changed. When the heel is down but the toe is raised, the door is closed, the gas shut down, the clutch still in and the brakes are off, and the bus is running slowly or slowing down due to the slowing down of the engine. By keeping the heel down and partially releasing the toe any desired regulation of the gas can be obtained.

Figure 3:
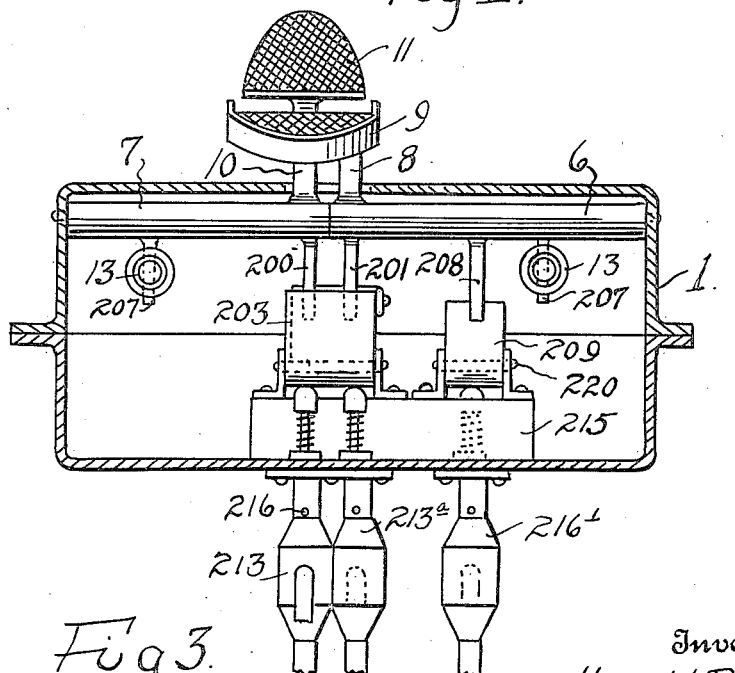
Fig. 3 is a sectional view taken on the line 3, 3, Fig. 1, and looking in the direction of the arrows.
Figure 4:
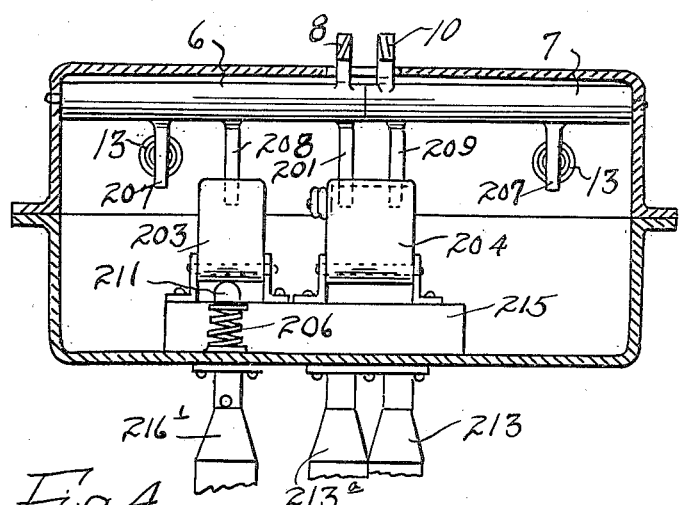
Fig. 4 is a sectional view taken on the line 4, 4, Fig. 1, looking in the direction of the arrows.

I prefer the arrangement of Figs. 3, 4 and 6 insofar as the number of valves employed, i. e. the provision of an additional valve 213ª, as shown in these figures, because it is sometimes preferable to adjust one to operate a fraction ahead of the other so that a partial depression of the toe or heel lever will close the door and yet not release the brakes, for example, to take care of a condition where the bus is on an incline or steep grade. From the foregoing it will be seen that I have supplied an exceedingly simple and highly efficient control for vehicles, which at all times provides for the safety of the passengers being conveyed thereby, but which confines all the necessary vehicle and appurtenance control to one foot of the operator, leaving the hands free for such other duties or operations as may be required.

It may sometimes be desired to be able to fully apply the brakes without danger of opening the door. This, however, would be an abnormal condition, and should not, in my opinion, be a condition which would automatically happen, although it would require but slight modification to render the same automatic. To take care of this abnormal condition, however, I provide an additional foot button 240, see Fig. 6, which foot button would preferably be placed in the control box at the side of the heel and toe controls. This foot button is normally maintained by a spring at one limit of its movement and is pivotally connected to an arm of a valve 241, whereby, when the button is depressed, the valve is turned so as to connect fluid pressure from the source 242, pipe 217ᵇ, to the valve 213, in the control box. The operation of the arrangement of Fig. 6 is as follows: When the foot is removed from both pedals the apparatus is in the position shown. Fluid pressure flows from pipe 242, pipe 217, pipe 23, valve 216′ and pipe 25 to cylinder 224 so that the clutch is in. The brakes are off because valve 213ª is closed. By depressing button 240 the valve 241 will operate to admit fluid pressure from 242 to pipe 217ᵇ to valve 213 and thence to engine 229 by pipe 26 to open the door. It will be seen that the door will not open even after the foot is taken off of the heel and toe levers until the foot is placed on this extra button, but depressing either the heel or toe levers would close the door whether the extra button was depressed or not.

Having now set forth the objects and nature of my invention, and having shown and described a structure embodying the principles thereof, what I claim as new and useful and of my own invention and desire to secure by Letters Patent is:

1. In a pneumatic car control, the combination with pneumatic brake, door operating and clutch mechanism, of a single lever for controlling said mechanism.

2. In a pneumatic car control, the combination with pneumatic brake and clutch mechanism, of heel and toe levers for selectively or simultaneously controlling said mechanism.

3. In a pneumatic car control, the combination with pneumatic door operating and clutch mechanism, of heel and toe levers for selectively or simultaneously controlling said mechanism.

4. In a pneumatic car control, the combination with pneumatic brake, door operating and clutch mechanism, of heel and toe levers for selectively or simultaneously controlling said mechanism for selectively or simultaneously controlling said mechanism.

5. In a car control, the combination of heel and toe operated levers mounted for rotation on the same shaft, means for maintaining said levers in inoperative position, means controlled by said levers for opening the car doors when said levers are in inoperative position, and means controllable by said levers for controlling a power source.

6. In a car control, the combination of means for controlling the clutch, means for controlling the door operating engine, a control box and heel and toe levers for controlling said clutch, and door engine means mounted in said box.

7. In a car control, the combination of means for controlling a clutch, means for controlling a door engine, means for controlling the brakes, a control box and toe and heel levers for controlling said clutch, door engine and brake means mounted in said control box.

8. In a car control, the combination of a pneumatic circuit, clutch operating means, brake operating means, door operating means, fuel control means, a control box, and control levers on said box for independently or simultaneously operating all of said means.

9. A car control comprising in combination a control box, means for operating the clutch, means for operating the brake, means for operating the doors, heel and toe levers mounted in said box for independently or simultaneously operating all of said means, and a separate control means for opening the doors.

10. In a car control, a pneumatic circuit, a clutch mechanism, a brake mechanism, a door operating mechanism, said pneumatic circuit being so arranged that it is capable of controlling each or all of said mechanisms, a control box, heel and toe levers mounted on said box, pneumatic valve mounted on said box and in said pneumatic circuit, said heel and toe levers being so connected to said valves that said brake, clutch and door mechanisms may be operated independently or in unison.

11. In a car control, a pneumatic circuit, a clutch mechanism, a brake mechanism, a door operating mechanism, said pneumatic circuit being so arranged that it is capable of controlling each or all of said mechanisms, a control box, heel and toe levers mounted on said box, pneumatic valves, mounted on said box and in said pneumatic circuit, said heel and toe levers being so connected to said valves that said brake, clutch and door mechanisms may be operated independently or in unison, said toe and heel levers having mounted short arms thereon, bell crank levers mounted in said control box and so arranged that said heel and toe levers may through said arms operate said pneumatic valves.

12. In a car control, a pneumatic circuit, a clutch mechanism, a brake mechanism, a door operating mechanism, said pneumatic circuit being so arranged that it is capable of controlling each or all of said mechanisms, a control box, heel and toe levers mounted on said box, pneumatic valves mounted on said box and in said pneumatic circuit, said heel and toe levers being so connected to said valves that said brake, clutch and door mechanisms may be operated independently or in unison, said toe and heel levers having mounted short arms thereon, bell crank levers mounted in said control box and so arranged that said heel and toe levers may through said arms operate said pneumatic valves, means in said control box for controlling the fuel supply, said fuel control means being operated by said toe lever and independent brake control means.

In testimony whereof I have hereunto set my hand on this 5th day of February, A. D. 1929.

HAROLD ROWNTREE.